United States Patent [19]

Watrous

[11] 4,141,049
[45] Feb. 20, 1979

[54] LOADING MECHANISM FOR NEGATIVE PRESSURE SLIDERS

[75] Inventor: Robert B. Watrous, San Jose, Calif.

[73] Assignee: International Business Machines Corporation, Armonk, N.Y.

[21] Appl. No.: 863,830

[22] Filed: Dec. 23, 1977

[51] Int. Cl.$^2$ ............................................. G11B 21/20
[52] U.S. Cl. .................................... 360/103; 360/102; 360/75
[58] Field of Search ................................ 360/102–103, 360/105–106, 75

[56] References Cited

U.S. PATENT DOCUMENTS

| | | | |
|---|---|---|---|
| 3,381,285 | 4/1968 | Wallen | 360/103 |
| 3,465,323 | 9/1969 | Horsfall et al. | 360/103 |
| 3,648,263 | 3/1972 | Kunstadt | 360/75 |
| 3,855,625 | 12/1974 | Garnier | 360/103 |
| 3,894,180 | 7/1975 | Canino | 360/102 X |
| 3,913,138 | 10/1975 | Stankiewicz et al. | 360/103 |
| 3,936,881 | 2/1976 | Orlando et al. | 360/103 |
| 4,071,854 | 1/1978 | Fichot et al. | 360/102 X |

OTHER PUBLICATIONS

IBM Technical Disclosure Bulletin, vol. 18, No. 11, Apr. '76, pp. 3813–3814.

*Primary Examiner*—John H. Wolff
*Attorney, Agent, or Firm*—James A. Pershon

[57] ABSTRACT

In a disk file, a mechanism places the magnetic transducer into and out of a transducing position by using the air flow generated in the file by the rotating disk. The magnetic head is biased out of contact with the magnetic disk media. As the disk media starts rotating and building up an air flow within the file, a nozzle directs this air against the slider to urge it towards the media. At running speed, the head is positioned at a flying height by negative air pressure generated by the slider flying over the media. The air flow nozzle can be a funnel shape formed in the arm assembly used to position the sliders over a track in the disk media or a knife edge assembly can be used to gather and direct the air flow towards the suspension and slider.

17 Claims, 8 Drawing Figures

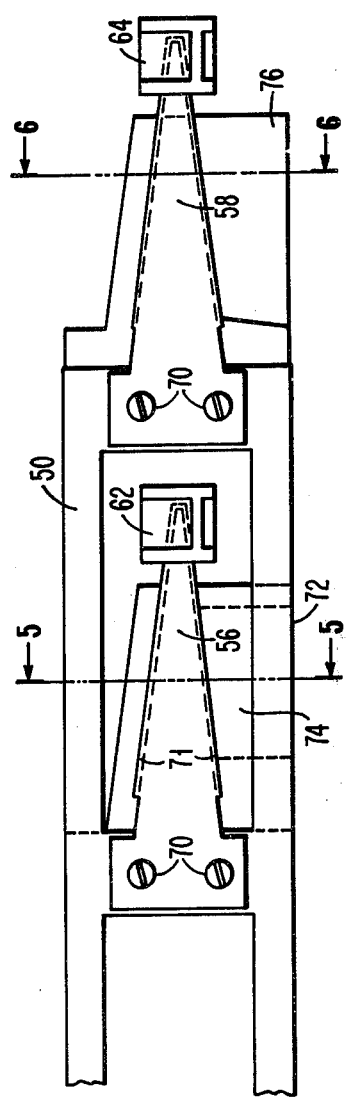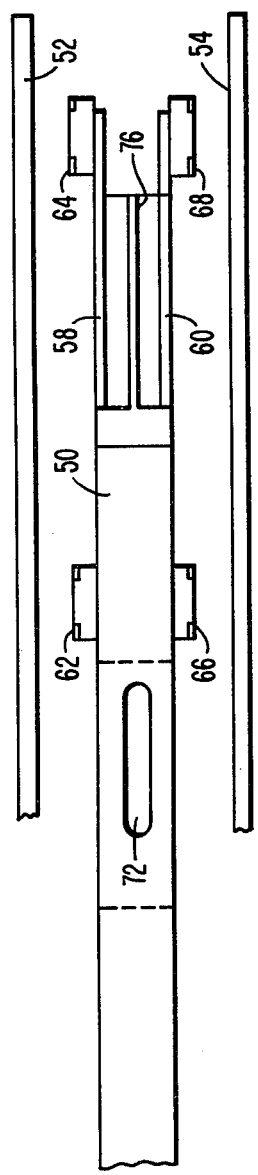

LOADING MECHANISM FOR NEGATIVE PRESSURE SLIDERS

BACKGROUND OF THE INVENTION

This invention relates generally to a dynamic magnetic information storage and retrieval system and more specifically to a fluid bearing head wherein the head is mounted to permit a floating position with respect to the record carrier.

FIELD OF THE INVENTION

Flying magnetic heads over a magnetic media is well known in the art. The heads normally are set in contact with the media when the media is stationary. As the media starts to move, an air flow is built up that permits the slider to fly at a very small distance from the media.

It is highly desirable to keep the head out of contact with the media when the media is stationary and the air bearing is not available to fly the head. For disk files, for instance, a special landing area is provided on the disk media so that when the slider comes into contact with the media it does not destroy some of the data contained in the magnetic transitions. This dedicates an area of the disk that could otherwise be for data information. A useful feature, therefore, would be to have a head assembly that was out of contact with the media during an at rest condition and was actuated into flying operation after the media reached an operational speed.

DESCRIPTION OF THE PRIOR ART

Many attempts have been made to provide an air actuated magnetic head that is retracted from the recording member and actuated into position by a compressed fluid. A bellow device such as shown in U.S. Pat. Nos. 3,479,661 to R. D. Scott and 3,488,648 to P. D. Church are examples of the prior art.

The Scott patent discloses a magnetic disk recording system that uses a flying magnetic head assembly. Resilient cantilever springs support the magnetic head and bias it towards the medium. The head assembly is restricted from the recording member by means of a bladder which expands when a fluid such as air or gas is injected into the bladder. The transducer is positioned over the medium when the air bearing surface and the force of the cantilever springs reaches an equilibrium at the required flying height.

It is, therefore, an object of the present invention to provide a flying head assembly that is biased out of contact with the magnetic media and is positioned into the flying position using the air flow generated by the relative motion between the media and the head assembly.

The Church patent shows a self-loading fluid bearing support for data recording heads. The Church patent discloses a magnetic media system that holds the head slightly out of contact with the media when the media is stationary and loads the head into position using the pressure generated by the relative motion between the media and the head. The head in Church is actuated into position by a resilient bellows that has an opening for gathering the pressure generated by the moving media. Thus, the fluid pressure responsive actuating means of Church is arranged for obtaining a supply of fluid derived from a position in the region of the head.

Another object of this invention, therefore, is to provide a head assembly using the air pressure generated by the relative motion between the media and the head to position the head into a flying arrangement with the media without the use of a device such as a bellows to retain the head in position relative to the moving media.

U.S. Pat. No. 3,465,323 to Horsfall et al. discloses a load/unload device where the head is urged out of contact with the record medium with a spring suspension. External fluid pressure is directed to a cylinder where it actuates a piston that drives the heads towards the record media. The fluid pressure forces the pistons out of the cylinder until an equilibrium develops between the air bearing developed by the head and the moving media, and the force exerted onto the head by the pistons.

Yet another object of the present invention is to provide a head assembly that is biased out of contact with the media during rest, that is placed into flying arrangement with the media by the pressure generated by the relative motion between the head and the media, and that is set into a flying arrangement with the media without the assistance of any external pressure except the air bearing generated between the head assembly and the recording media.

U.S. Pat. No. 3,381,285 to D. L. Wallen discloses a magnetic disk file construction in which the flying heads are urged towards the recording surface by pneumatic pressure created by the rotating action of the disk. The heads are supported by springs which urge them away from contact with the surface of the disk until the disk reaches an operating speed. The disk in the Wallen patent is serrated at its periphery such that as it rotates, it causes a centrifugal air flow from its outer periphery. Plates are mounted above and below the disk to concentrate the air flow into a passageway. As the disk rotates, air is forced into the passageway and directed against the slider. The airflow is regulated by a needle valve set screw to overcome to biasing of the suspension system to place the head in the flying operation with the media.

Therefore, a further object of this invention is to provide a simplified method of directing the air flow from a moving magnetic media to position the head in flying arrangement with the slider, wherein the surface of the media generates the air flow and the slider uses a negative pressure arrangement to remain in flying arrangement with the magnetic media.

SUMMARY OF THE INVENTION

The present invention uses the air flow built up by the relative motion between the magnetic media and the magnetic head to both load the magnetic head assembly into flying height and to hold the head into position intimate to the media. Suspension springs load the slider away from rather than towards the media.

In accordance with the present invention, a head load/unload mechanism uses a slider that develops a negative pressure generated while the slider is flying over the magnetic media during operation. If no air bearing surface is formed, such as when there is no relative motion between the head and the media, the head is loaded away from the media. As the relative motion is developed and an air pressure is produced, a fluid flow collecting means is activated to allow the generated air pressure to urge the head against the media. At operational speeds, the fluid flow collecting means can be deactivated and the flying height of the head is determined by the negative air pressure generated by its slider.

An object of the present invention, therefore, is to provide an enhanced head loading and unloading mechanism.

In particular, a head assembly loading and unloading device is provided for supporting a head assembly over a recording disk media on a bearing surface created by a fluid motion generated by the rotation of the disk. The loading and unloading device includes a slider having a negative pressure generating air bearing surface. The suspension means resiliently urges the slider away from the disk. Fluid flow collecting means are provided for directing the fluid flow generated by the rotating disk to urge the slider towards the disk. Controllable valve means can be included for regulating the fluid flow according to the operation of the disk and the position of the slider relative to the disk.

Another object of this invention, therefore, is to provide an enhanced head assembly loading and unloading device for a disk file assembly.

Yet another object is to provide a head assembly loading and unloading device for a plurality of sliders positioned between adjacent disk recording medium in a disk file.

These and other objects of the present invention will become apparent to those skilled in the art as the description proceeds.

BRIEF DESCRIPTION OF THE DRAWINGS

The various novel features of this invention along with the foregoing and other objects, as well as the invention itself both as to its organization and method of operation, may be more fully understood from the following description of illustrated embodiments when read in conjunction with the accompanying drawings wherein:

FIG. 3 is a plan view of a head/arm assembly including a plurality of slider assemblies and a second embodiment of the present invention;

FIG. 4 is a side view of the head/arm assembly of FIG. 3;

FIG. 5 is a cross sectional view taken along lines 5—5 of FIG. 3 showing the construction of the fluid flow collecting means according to the present invention; and FIG. 6 is a cross sectional view taken along lines 6—6 of FIG. 3 showing a third design of the fluid flow collecting means according to the present invention.

DESCRIPTION OF THE PREFERRED EMBODIMENT

Figure 1:
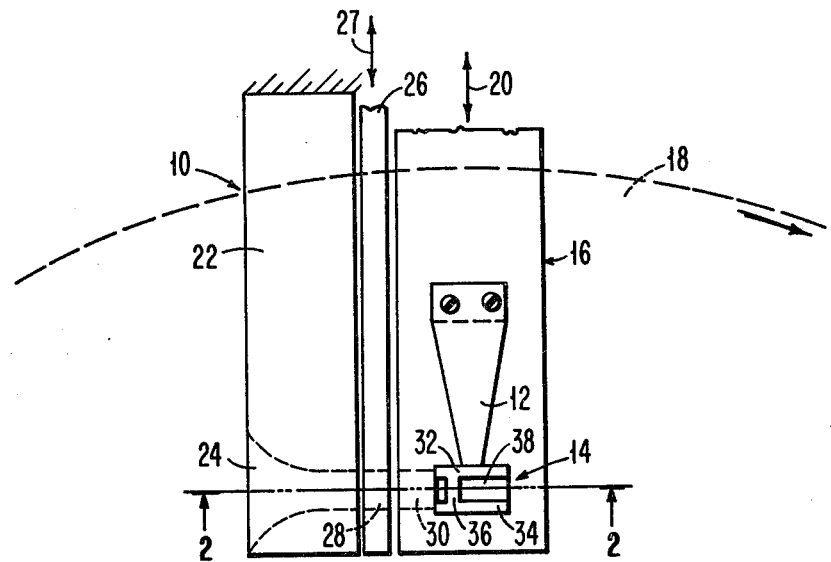
FIG. 1 is a plan view of a head/arm assembly showing the negative pressure slider and the fluid flow collecting means according to the present invention.

Referring to FIG. 1, a magnetic head load/unload mechanism 10 for a disk file assembly made in accordance with the present invention includes a suspension system 12 supporting a negative pressure generating slider 14 and connected to an accessing head/arm assembly 16 which positions the slider 14 relative to a track (not shown) on a disk recording media 18. The accessing arm 16 is connected to a positioning mechanism (not shown) which moves the arm in an accessing motion as shown by an arrow 20. A bar 22 containing a nozzle 24 is fastened to the disk file assembly. A shutter assembly 26 is slidably positioned in the direction shown by an arrow 27 between the nozzle bar 22 and the head/arm assembly 16. The shutter assembly 26 through an opening 28 provides a valve assembly for opening or closing access of a fluid media through the nozzle 24 to a curved passageway 30 in the head/arm assembly 16. The nozzle 24, the opening 28 in the shutter assembly 26, and the curved passageway 30 form the fluid flow collecting means of this embodiment. A more complete description of the head load/unloading mechanism 10 is shown in FIGS. 2a-c.

A slider design usable for the generation of the negative air pressure is disclosed in U.S. Pat. No. 3,855,625 to M. F. Garnier et al. and assigned to the assignee of the present invention. In that patent, the slider 14 is formed with two side rails 32 and 34 and a cross rail 36 joining the two side rails. The leading edge of the cross rail is formed with a sharp rectangular corner and does not have a corner break or rounded edge. The three rails delineate a rectangular recessed section 38 or it can delineate a tapered recess section. Magnetic transducer elements (not shown) can be bonded to the end of the rails 32 and 34 with their transducing gap flush with the rail surface. The slider flies very closely to the magnetic media. The slider is self loading toward the disk by the negative pressure zone occurring in the recessed region 38 behind the cross rail 36. The position of the lateral rail 36 establishes the center of the negative pressure region that follows the rail. The closed side design of the slider 14 provides a low-load and self-acting air bearing at the slider surface facing the magnetic disk 18.

Figure 2A:
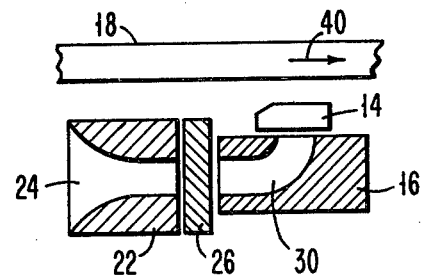
FIG. 2a, 2b, and 2c is a cross sectional view taken along line 2—2 of FIG. 1 and show the relative position of the head load/unload mechanism of the present invention during an at-rest, startup, and run position, respectively.

Referring to FIG. 2a, the position of the different assemblies is shown for an "at-rest" situation. Thus, the disk 18 is stopped and the slider assembly 14 is positioned against the head/arm assembly 16 by the suspension system. For clarity, the suspension system 12 is not shown in FIGS. 2a-c. The access between the nozzle opening 24 of the nozzle bar 22 and the curved passageway 30 in the head/arm assembly 16 is shown blocked by the shutter arm 26. In the at-rest position, the slider 14 is unloaded, that is, removed from an active position adjacent to the disk 18. In this position, the head/disk contact is eliminated thereby decreasing the wear on both the slider 14 and the disk magnetic media and thereby potentially eliminating data loss.

Figure 2B:
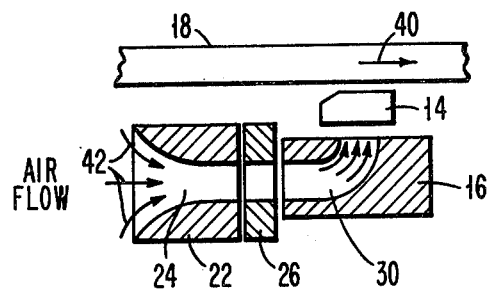
Figure 2C:
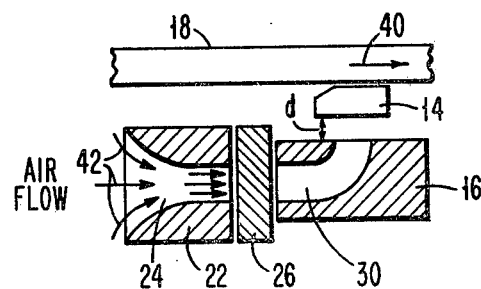

In FIG. 2b, the assembly is shown during a startup condition when the disk 18 is starting to rotate in the direction of an arrow 40. An air flow, as shown by the arrows 42, begins to be collected by the nozzle 24. The air flow is generated by the friction between the surface of the magnetic disk 18 and the surrounding fluid such as air. During the startup, the shutter bar 26 is positioned such that the access of the air fluid flow can pass through the shutter bar 26 via its opening 28 and into the curved passageway 30 of the head/arm assembly 16. The air fluid flow is directed against the head assembly, shown schematically in FIG. 2b as being directed against the slider 14. The slider 14 moves away from the head/arm assembly 16 by the fluid force and starts to approach a position adjacent to the now-rotating disk 18.

In FIG. 2c, the slider 14 is shown positioned in a flying operation over an air bearing created by the rotating disk. The slider 14, according to the present invention, has a negative pressure generating region which must create a force sufficient to overcome the suspension system 12 since the suspension system 12 is preloaded to hold the slider 14 away from the disk 18. At this time, the shutter assembly 26 is shown blocking the air flow from the nozzle 24 to the curved passageway 30 in the head/arm assembly 16. The shutter assembly 26 may or may not block the air flow depending upon the effect that the air flow will have upon the now-flying slider 14. The shutter need not block the air flow if the distance d between the end of the curved passageway 30 in the head/arm assembly 16 is sufficient such that air flow does not impinge too strongly upon the slider 14 which could effect the flying characteristics of the slider. The present invention uses the air flow generated by the surface of the recording media to accomplish the loading of the head assembly while the slider design via the air bearing also developed by the surface of the moving media operates to position the slider adjacent to the media during operation. The air flow generated by the rotating disk 18 is collected and directed by the fluid flow collecting means into contact with the slider 14 thereby overcoming the unloading force of the suspension system 12 and moving the slider 14 towards the disk. As the disk 18 starts to slow during a stop operation, the negative pressure generated by the slider 14 decreases and the suspension system 12 will draw the slider 14 away from the disk 18 back to its at-rest position adjacent to the head/arm assembly 16. Thus, the present invention provides an automatic load-/unload system that requires no movement of the accessing head/arm assembly 16 to a particular at-rest position and includes no moving parts on the head/arm assembly 16 to accomplish the placement of the slider in flying operation with the magnetic media.

In FIGS. 3–6, a second embodiment of the present invention is shown. In the standard disk file, a head/arm assembly 50 is positioned between two closely spaced disks 52 and 54. Data accessing to the recording media is via the underside of the top disk 52 and the topside of the lower disk 54. Thus, the single head arm assembly 50 provides access to both disks. Furthermore, a plurality of head assemblies, four shown, are generally fastened onto one accessing arm. This permits a shorter travel by the accessing arm since each head assembly need address only a portion of the track area of its associated disk media. The head/arm assembly 50 includes four suspension systems, three are shown by reference numerals 56, 58 and 60, supporting sliders 62, 64, 66 and 68. The suspension systems are fastened to the head/arm assembly by screws 70, for instance. The suspension systems, reference numeral 56 for instance, can include flanges 71 that provide a stiffening of the suspension and a means for assisting in the concentration of the air flow for urging the sliders towards the disks.

Referring to FIGS. 3 and 4, the loading and unloading of sliders 62 and 66 is accomplished by a fluid flow collecting means in the form of an elongated notch nozzle accessing passageway 72 and an interior formed in the head/arm assembly 50, and in the form of a knife edge air scoop 76 for the loading and unloading of the sliders 64 and 68. Both the elongated notch nozzle 72 and the knife edge scoop 76 direct air to two head/slider assemblies positioned above and below the head/arm assembly of FIG. 4. The fluid flow is shown directed to the suspension system rather than to the slider as shown in FIG. 1 because of the larger areas generally occupied by the suspension system. The general design of the nozzle 72 and the knife 76 of the head/arm assembly 50 is shown in FIGS. 5 and 6, respectively.

Referring to FIG. 5, air flow enters the notch nozzle accessing passageway 72 in the leading edge of the head/arm assembly. The air flow travels through the interior passageway 74 into a passageway 78 perpendicular to the interior passageway 74. The suspension systems 56a and 56b form the valves covering the openings at the end of the perpendicular passageway 78 on both the top and bottom sides of the head/arm assembly 50. The notch nozzle accessing passageway 72 of FIG. 5 is similar in operation to that discussed for FIGS. 1 and 2 except that the air flow impinges on both the up and down suspension system in FIG. 5 to urge the head/slider assemblies towards the moving media. As the sliders 62 and 66 approaches the moving disks 52 and 54, each slider generates a negative pressure region that is sufficient to overcome its suspension system which urges the slider away from its associated disk towards the head/arm assembly 50.

The knife-edge scoop 76 type of fluid flow collecting means is shown in cross section in FIG. 6. In FIG. 6, the air flow is scooped by the knife-edge formed head/arm assembly and directed toward the suspension system 58 and 60 poised above and below the head/arm assembly.

The operation of the embodiment of FIGS. 3–6 is the same as that discussed for FIGS. 1 and 2. At rest, each slider assembly is positioned adjacent to the head/arm assembly 50 and away from its associated disk by the force of its resilient suspension system. As the disks start to rotate, the air flow pressure generated by the disks increases. This air flow is gathered by the fluid flow collecting means, either the elongated notch accessing passageway 72 or the knife edge scoop 76 or both, and their associated passageways to urge the suspension assemblies towards the disk to position the sliders adjacent to the magnetic material on the disk. The negative pressure generated by the sliders produces a force that overcomes the suspension system springs to hold the sliders and their associated transducers adjacent to the magnetic media to record data or to read data from the disks.

The principles of the present invention have now been made clear in an illustrated embodiment. There will be immediately obvious to those skilled in the art many modifications of structure, arrangement, proportion, the element, materials and components used in the practice of the invention. For instance, any type of shutter arrangement could work with the embodiment shown in FIGS. 1 and 2. Potentially, no shuttering system is needed since it is the air flow generated by the relative motion between the media and the head assembly that creates it. The slider is biased away from the disk and is therefore at an at-rest condition without the air flow and, since the slider is positioned the distance from the air passageway during operation, no shutoff is required. Thus, the passageway for the air flow could be continuous from the inlet to the nozzle 24 through the air passageway 30 in the head/arm assembly 16 to the slider assembly 14 without having a shutter valve. Further, other negative pressure generating sliders of other designs are usable for the slider of the present invention. For instance, the grooved air bearing head of U.S. Pat. No. 3,855,624 is usable with the present invention. It should also be evident that the particular combination of fluid flow collecting means as shown in FIGS. 3–6 could be all of one type and could contain more than the two shown on one head/arm assembly. The appended claims are, therefore, intended to cover and embrace any such modification, within the limits only of the true spirit and scope of the invention.

I claim:

1. A device for supporting a transducer in operating sensing position over a recording medium on an air bearing generated by a fluid flow caused by the motion of the surface of the recording medium, said device comprising:

a slider having the transducer affixed thereto and having at least a negative-pressure generating air bearing surface for operation with said fluid flow to urge said slider towards the surface of the recording media;

an arm assembly;

suspension means fastened to said arm assembly and said slider for resiliently urging said slider towards said arm assembly; and fluid flow collecting means integral to said arm assembly for directing said fluid flow to urge said slider and the transducer away from said arm assembly into its operating position;

so that said negative-pressure generating air bearing surface of said slider keeps said slider and the transducer in its operating sensing position in opposition to said suspension means.

2. A device as defined in claim 1 wherein said recording medium is a magnetic recording disk.

3. A head assembly loading and unload device as defined in claim 1 including controllable valve means to regulate the fluid flow from said fluid flow collecting means according to the slider-to-recording medium distance.

4. A device as defined in claim 3 wherein said slider forms the controllable valve means.

5. A device as defined in claim 1 further including a second slider having a negative pressure generating air bearing surface and an associated arm assembly and suspension means urging said second slider towards its associated arm assembly mounted for movement in a plane parallel to the first recording medium wherein said fluid flow collecting means directs the fluid to urge both sliders towards their respective recording medium.

6. A device as defined in claim 1 wherein said fluid flow collecting means comprises a nozzle formed in said arm assembly for collecting and directing the fluid to said slider.

7. A device as defined in claim 1 wherein said fluid flow collecting means comprises a portion of said arm assembly which portion is formed to redirect the fluid flow from approximately parallel to the recording medium to approximately perpendicular thereto to urge said slider towards said recording media.

8. A slider loading and unloading device as defined in claim 1 wherein said slider is formed with a taper flat outer rail to provide a positive pressure region with a recessed portion delineated by an inverse step cross rail between the outer rails and disposed towards the leading edge of the slider to provide the negative pressure region.

9. A slider loading and unloading device as described in claim 1 wherein the head element is mounted at the trailing edge of at least one outer rail.

10. An assembly operable for supporting a transducer in recording position relative to a recording medium, said assembly comprising in combination:

an arm;

a slider having the transducer affixed thereto and having at least a negative-pressure generating air bearing surface for operation with the fluid flow created by operation of said recording medium to urge said slider towards the surface of said recording medium;

suspension means for resiliently fastening said slider to said arm, said negative-pressure generating air bearing surface of said slider capable of generating a force larger than and in an opposing direction to the force provided by said resilient suspension means; and fluid flow collecting means formed in said arm for collecting and directing the fluid flow created by operation of said recording medium to impinge upon said slider and said suspension means in opposition to said resilient suspension means for urging said slider and the transducer away from said arm and into its recording position relative to the medium.

11. An assembly as defined in claim 10 further including a second slider having a negative pressure generating air bearing surface and an associated arm assembly and suspension means urging said second slider towards its associated arm assembly mounted for movement in a plane parallel to the first recording medium wherein said fluid flow collecting means directs the fluid to urge both sliders towards their respective recording medium.

12. An assembly as defined in claim 10 wherein said fluid flow collecting means comprises a nozzle formed in said arm assembly for collecting and directing the fluid to said slider.

13. An assembly as defined in claim 10 wherein said fluid flow collecting means comprises a portion of said arm assembly which portion is formed to redirect the fluid flow from approximately parallel to the recording medium to approximately perpendicular thereto to urge said slider towards said recording media.

14. A head/arm assembly operable for supporting a slider/transducer assembly over a recording medium on an air bearing generated by an air flow caused by the motion of the surface of the recording medium, said slider having at least a negative-pressure generating air bearing surface for operation with said air flow to urge the slider/transducer assembly into flying intimate relation to the recording medium while in operating position wherein the improvement comprises:

suspension means for resiliently urging said slider away from said recording medium and toward an arm assembly; and fluid flow collecting means integral to said arm assembly for collecting and directing said air flow to impinge upon said slider and said suspension means to urge said slider away from said arm assembly and into its operating position.

15. In combination:

a recording medium generating a fluid flow at its surface by motion thereof;

a slider having a negative-pressure generating air bearing surface for operation with said fluid flow to urge said slider into flying intimate relation to said recording medium;

an arm assembly for positioning said slider over said recording medium;

suspension means fastened to said arm assembly and said slider for resiliently urging said slider away from said recording medium; and means integral with said arm assembly for directing said fluid flow to urge said slider towards the recording medium wherein the negative-pressure generating air bearing surface of said slider holds said slider in a recording position relative to said recording medium.

16. A combination as defined in claim 15 wherein said recording medium is a magnetic recording disk.

17. A combination as defined in claim 15 further including a controllable valve means to regulate the fluid flow from said directing means according to the slider-to-recording medium distance.

* * * * *